United States Patent [19]

Overbye

[11] 3,982,404
[45] Sept. 28, 1976

[54] INDIVIDUAL QUICK-FREEZING OF MOIST ARTICLES USING DEEP FLUIDIZED BED AND INPUT CONDITIONER

[75] Inventor: Milan R. Overbye, Kent, Wash.
[73] Assignee: Lewis Refrigeration Co., Woodinville, Wash.
[22] Filed: Nov. 4, 1974
[21] Appl. No.: 520,294

[52] U.S. Cl. .................................... 62/57; 62/63; 62/65
[51] Int. Cl.² ........................................ F25D 17/06
[58] Field of Search .................. 62/57, 63, 380, 65; 426/524

[56] References Cited
UNITED STATES PATENTS

| | | | |
|---|---|---|---|
| 1,930,414 | 10/1933 | Buhr | 62/380 |
| 2,402,921 | 6/1946 | Sharpe | 62/380 X |
| 3,477,242 | 11/1969 | Lamb et al. | 62/57 X |
| 3,807,186 | 4/1974 | Hardy | 62/57 |
| 3,864,931 | 2/1975 | Guttinger | 62/65 |

*Primary Examiner*—William F. O'Dea
*Assistant Examiner*—Ronald C. Capossela
*Attorney, Agent, or Firm*—Christensen, O'Connor, Garrison & Havelka

[57] ABSTRACT

An I.Q.F. system for deep freezing of food articles and the like employing a deep bed fluidization second stage freezer and an article conditioning first or input stage wherein the initially moist unrefrigerated articles massed in a relatively thin deposit are subjected to through-flow of subfreezing gas, preferably under fluidization conditions, for a predetermined period which removes substantially all of the sensible heat above freezing without removing the latent heat from the articles, whereupon, articles thus in condition compatible for deep bed fluidization freezing in the second stage are delivered from the first to the second stage.

11 Claims, 3 Drawing Figures

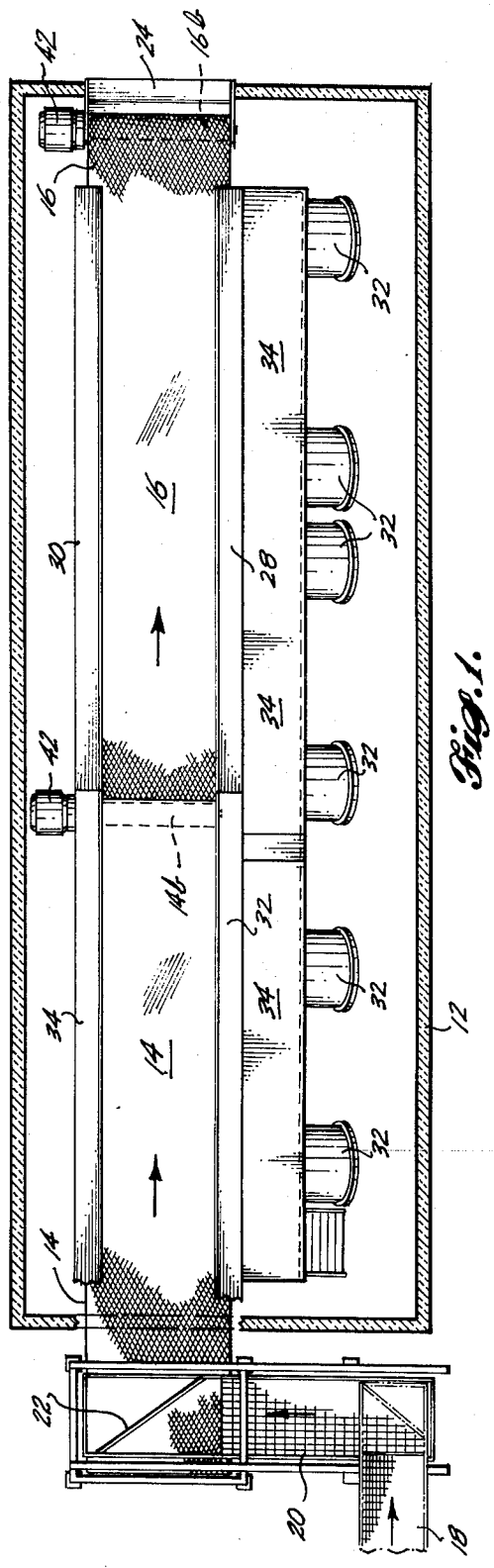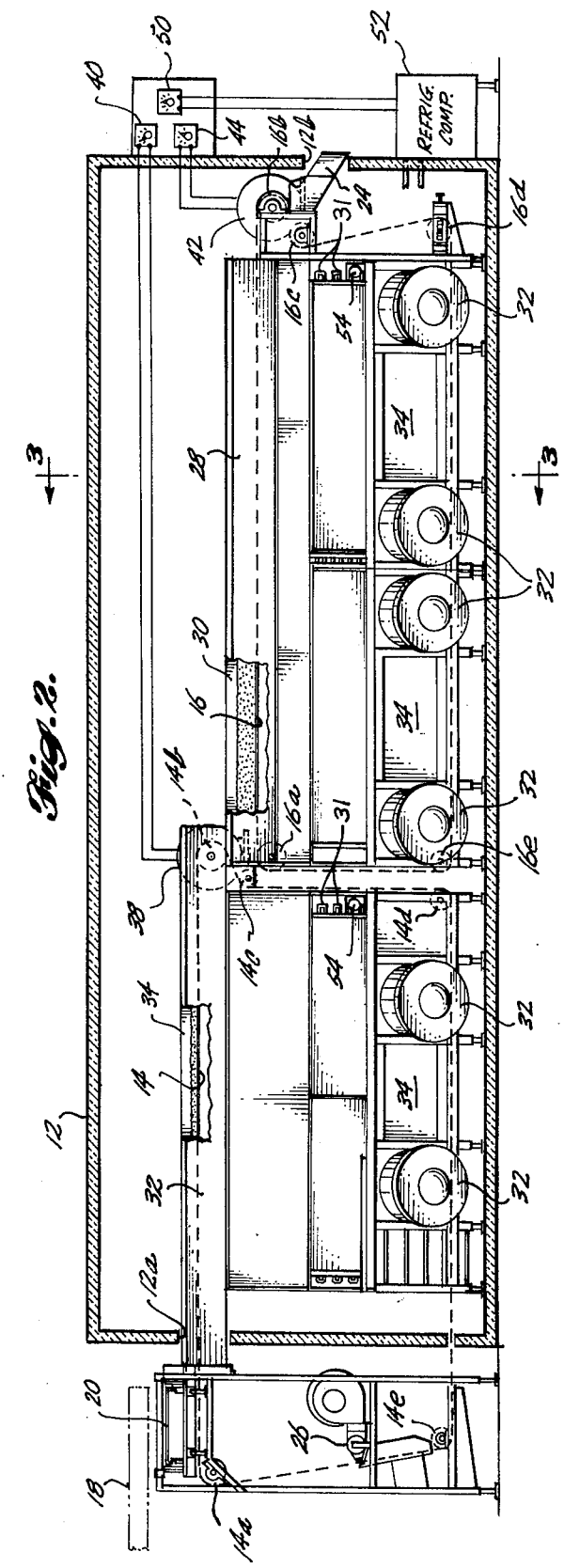

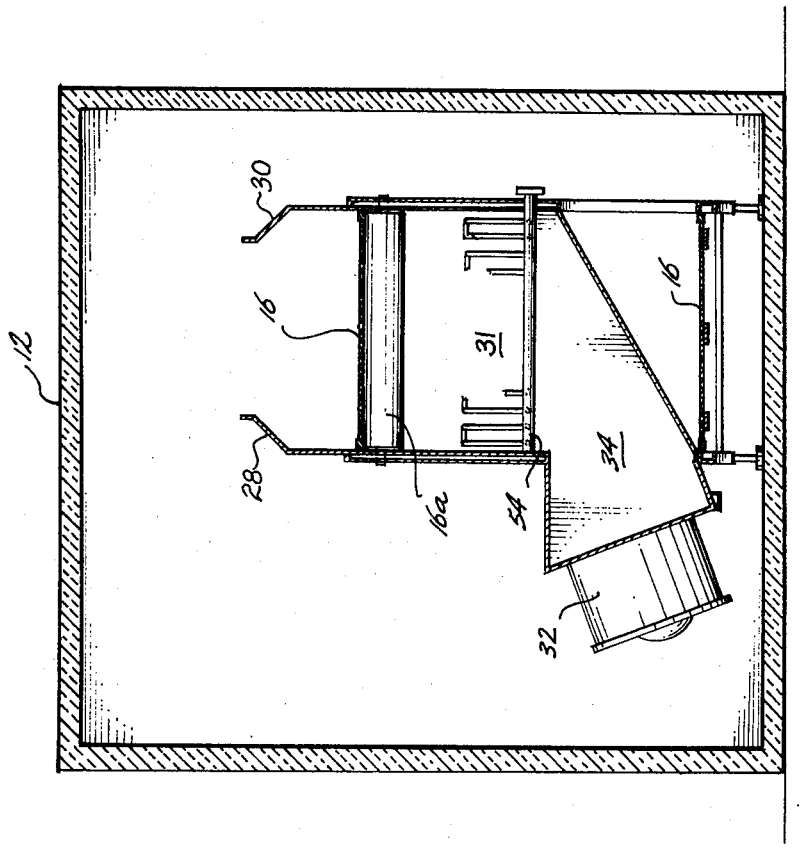

INDIVIDUAL QUICK-FREEZING OF MOIST ARTICLES USING DEEP FLUIDIZED BED AND INPUT CONDITIONER

BACKGROUND OF INVENTION

This invention relates to improvements in methods and apparatus for freezing foods and similar articles employing I.Q.F. (individually quick-frozen) techniques wherein the articles in a "fluidized" bed are frozen in an individually separate state rather than in a cohesive state. More particularly, the invention is directed to improvements that reduce the installation and operating costs of such systems while producing a frozen product of superior quality.

The term "fluidized" in the present context refers to the condition in which a mass of solid articles tends to act somewhat as a fluid, that is, a condition wherein the articles are semi-suspended individually and relatively motile somewhat like the molecules of a fluid. In I.Q.F. food processing, fluidization is most commonly created or maintained by forced flow of a gas such as air passed upwardly through the mass.

It was long ago discovered that food articles such as beans, peas, berries, cut corn, etc. could be quickly and individually frozen when subjected to a fluidized bed condition created by an updraft of air or other gas cooled to subfreezing temperatures. Due to the tendency of the articles to stick together because of moisture (i.e., wash water and/or juices), reliably achieving and maintaining fluidization required not only a thin bed of articles but a bed of uniform thickness and uniformity of air flow through the bed. In practice these conditions were difficult to achieve, leading to development of various means of "excitation", assisting the mass of articles to enter and maintain a state of fluidization. Some of these excitation techniques included use of secondary air jets at the entrance end of the foraminous conveyor supporting the articles so as to induce augmented vertical motion of the articles at that location where they are most wet and sticky. A "reload" bar of half-oval configuration placed transversely across and immediately above the conveyor belt at a point down the line of conveyance was also used. It served to dislodge any articles that might begin freezing to the conveyor belt, functioned as a leveling weir which helped redistribute the fluidized mass of articles more uniformly across the full width of the conveyor belt and helped insure maintenance of fluidization as freezing continued. Those and other excitation devices were also considered necessary to permit safely increasing belt loading depth in order to satisfy increasing commercial production capacity demands on prior systems.

With the ability to freeze the articles in a fluidized bed of increased depth, it became feasible to run the conveyor belt more slowly and thus to produce improved freezing action even with the system operating at high evaporator temperatures so as to minimize energy consumption by the compressors. However, for practical purposes the fluidized bed depth in such prior single-conveyor freezing systems was limited to about 2 inches when operating with initially wet vegetables or fruits since with greater depths it became excessively difficult to induce and maintain fluidization by any means.

By operating two independent fluidized bed freezing systems in series, with the conveyor of the second system running at a materially lower speed than the conveyor in the first system, it became possible in one prior art installation to load the second conveyor with vegetables such as corn to a depth of 5 to 6 inches. This permitted operating the tandem systems at still higher evaporator temperature, hence, more efficiently, without impairing the uniformity of deep freeze imparted to the final product. In fact, it permitted freezing the product colder than in earlier systems with less expenditure of energy and without unduly increasing the plant floor area occupied by the overall system. In that endeavor, cut corn partially frozen on the conveyor of the first system, for example, was discharged through a connecting air conveyor onto the more slowly moving conveyor of the second system which completed freezing of the product down to the desired final temperature. A higher quality product resulted.

Despite the advantages accruing from the tandem dual freezer system installation just described, I.Q.F. operation in both freezers required the usual critical attention to creating and maintaining full fluidization conditions in both systems. This implied observance of full system design and operating criteria in the first system as well as the second, and required continued attention to product loading uniformity and depth, and to air flow uniformity and vigor.

As a reult of recognizing these continued shortcomings but also the advantages of the dual tandem system just described, it became apparent in the conception of the present invention that an improved two-stage system was possible that could take best advantage of a short-run deep bed noncritical fluidization second stage freezer operated at higher, more efficient evaporator temperature, by combining it with a simplified, noncritical article-conditioning first stage. More specifically, it was discovered that preparing the articles for introduction to the deep bed fluidization second stage in a condition compatible with easily maintained deep bed fluidization freezing there could be accomplished without the requirement of a critically designed and critically operated fluidized bed first stage article freezer.

In the latter regard, it was also recognized that the older concept of precooling food articles for a short time in refrigerated air held at or about freezing temperature (i.e. approximately 30°F.) before entering the freezer itself would be ineffective conditioning preliminary to deep bed fluidization freezing employing bed depths in the range of 4 to 6 inches, for example. This kind of conditioning removed some of the sensible heat but left the articles at a temperature well above freezing with little affect upon their sticking tendency due to surface moisture. That possibility was therefore quickly rejected as offering no answer to achieving the objectives herein.

In accordance with this invention, a two-stage system is provided which minimizes compressor energy consumption, reduces equipment costs, minimizes plant floor area requirements, and yields frozen products of still better quality. A more specific object is to devise a deep bed fluidization freezer combined with an effective but versatile article-conditioning first stage, relatively noncritical of operation and relatively noncritical of design, capable of feeding articles to the deep bed fluidization stage in a superior condition for the purpose, compared with earlier precoolers and earlier first stage product freezers.

BRIEF GENERAL DESCRIPTION OF INVENTION

It was discovered in accordance with this invention achieving the above-stated objects that food articles moist from washwater or from juices can be best and most efficiently conditioned for entering the deep bed fluidization second stage of the system by subjecting the articles amassed in the first stage to through-flow of gas such as air at subfreezing temperature for a relatively short time period calculated to remove substantially all of the above-freezing sensible heat without removing the latent heat from the articles. In that condition the articles are delivered directly and compatibly into the deep bed fluidization second stage of the system. Preferably the first stage comprises a fluidized bed foraminous conveyor which advances the articles at a relatively high speed to deposit them into the deep bed fluidized mass of articles being carried at a relatively low speed by the conveyor in the second stage. Coordination between the rate at which the articles are advanced on the first stage or conditioning conveyor, hence their dwell time in the first stage, and the rate at which heat is withdrawn from the articles during that time provides the desired article conditioning.

While fluidization of the articles in the first stage is desirable for chilling efficiency, full and continuous fluidization is not a critical necessity to prevent cohesion between articles inasmuch as the articles although reduced in temperature to the point of freezing, are not predominantly frozen. Because some or all of the latent heat is left in them, any ice that may form on some surfaces of some articles is too weak to cause the articles to stick together. Because of that fact, and the use of an input conveyor that moves at a relatively rapid rate and can thereby carry its assigned volume with a thin load of articles, fluidization is comparatively easy to achieve despite load depth variations and air flow nonuniformities occasioned thereby. Thus as an added benefit, the reasons which make fluidization or uniform fluidization in the first stage not critical in the old sense are the very reasons that make fluidization easily obtainable as a factor in achieving highest operating efficiency in the first stage.

With such a system, food articles deposited on the deep bed fluidization (second stage) conveyor have been reduced in temperature by the conditioning stage predominantly to the incipient freezing point indicated above but are not frozen. By the term "predominantly" is meant that the articles are largely in the described condition. This term is used in these specifications and the appended claims as a practical matter because ideal conditions are not fully attainable in practice. It will be recognized in practice that it is impossible to achieve identical conditions for each article of food in a mass of articles subjected to such a short-term conditioning process. Thus although the articles predominantly have been conditioned in the described manner, a small proportion of the articles may have lost all of their latent heat and a small proportion may have lost less than all of their sensible heat above freezing.

In effect then, with fresh fruit and vegetables comprising the articles being processed, such articles are delivered predominantly at or near 30°F. to the deep bed fluidized freezer, which means that if any freezing has been initiated in such articles, the ice forming would have no appreciable bonding strength and the surface water will have a very low surface tension, minimizing any tendency for article cohesion. Thus the articles dropped onto the deep fluidized bed of the second-stage conveyor are compatible to ease of fluidization there with minimal fluidizing force and are readily depressed to the desired final temperature by the prolonged "soaking" period allowed in the latter stage.

Furthermore, it became possible to operate the entire system at evaporator temperatures of approximately −25°F. as contrasted with prior conventional single-stage systems requiring temperatures of the order of −35°F. common in the industry, indicating a compressor energy saving of approximately 20%.

As an added but highly important benefit, by allowing some of the surface moisture to remain on the articles as a result of their rapid transit through the first stage, a better appearing final product is achieved probably due to moisture glaze frozen on the surface and, for the same reason, a product having somewhat longer shelf life. Moreover, with the increased speed of conveyance and shortness of dwell time of the moist articles in the first stage, frost loading in the freezing tunnel is no longer concentrated near the head end but is distributed downstream over the length of the tunnel resulting in a substantial reduction in the number of shutdowns needed to defrost the system by reason of frost concentrations.

There is also an attendant capability within such a system to handle effectively and flexibly a wider variety of sizes and shapes of articles to be frozen with less need for making accommodative adjustments of conveyor speed and air temperature, than in prior systems. There is also less need, if any at all, for secondary excitation either from mechanical devices or airblowers in order to induce and maintain product fluidization. This is true in both first and second stages, and in the latter, conditions are such that reductions of fluidization freezing air flow are possible (i.e., some of the normally required blowers can be turned off).

Where conveyors are normally used in the first and/or second stages of the improved system to provide a continuous flow process, these conveyors may be of any suitable type, such as belt-type conveyors, static tray-type conveyors wherein the product "flows" progressively by gravity and/or other impetus from one end of a foraminous stationary tray to the opposite end for discharge, and others. Moreover, while either common or separate refrigeration coils may be used in the two stages of the improved system, the same evaporator temperature may be used in both sections of the system. Temperature of subfreezing air emerging from the refrigerator coils is not critical in either stage although it must be within reasonable limits to chill the product to the desired condition in the first stage and to the desired final temperature in the second stage.

These and other features, objects and advantages of the invention will become more fully evident from the following description by reference to the accompanying drawings.

DESCRIPTION OF DRAWINGS

FIG. 1 is a simplified plan view of a preferred form of commercial freezer incorporating the invention.

FIG. 2 is a simplified side elevation view with parts broken away and partially in schematic form illustrating the preferred embodiment.

FIG. 3 is a simplified sectional view taken on line 3—3 in FIG. 2.

DETAILED DESCRIPTION OF ILLUSTRATED EMBODIMENT

As illustrated, the improved two-stage article freezing system of this invention may be incorporated in an elongated insulating housing or tunnel 12 of conventional design. The two-stage freezing system includes the input or conditioning conveyor 14 and the output or deep bed fluidization conveyor 16. The receiving end of the active upper stretch of input conveyor 14 extends through a wall aperture 12a in the end of enclosure 12. Food articles to be frozen are deposited on input conveyor 14 by suitable means which in the example includes a primary feed conveyor 18, a dewatering shaker 20 which removes much of the washwater from the food articles, and a loading device 22 which tends to spread the articles evenly across the width of the input conveyor 14. At the opposite end of the enclosure 12, the deep-frozen articles discharged by the deep bed fluidization conveyor 16 drop onto a chute 24 which delivers the articles through an opening 12b in the end wall of the enclosure. The details of the discharge chute and the details of the mechanism by which articles are deposited initially on the first stage or input conveyor 14 are of secondary concern and require no special elaboration or description herein.

Preferably conveyors 14 and 16 are of the belt-type and more specifically of the familiar type of foraminous construction comprising an open gridwork of articulated rows of spaced links which allow free passage of air upwardly through the belt while holding the shelled peas, cut corn, strawberries or other food articles to be frozen in fluidized condition thereon. The active or upper generally horizontal stretch of input conveyor 14 is defined by the longitudinally spaced horizontal guide rolls 14a and 14b mounted at a common horizontal level, and a succession of return run guide rolls 14c, 14d and 14e mounted on the frame system of the apparatus parallel to the rolls 14a and 14b. Guide rolls 14d and 14e are mounted near the bottom of the enclosure below the respective rolls 14b and 14a to form a large generally rectangular open loop of the conveyance belt run. Roll 14c is a deflector which reverses the direction of the belt passing around roll 14b so as to permit the belt rounding such latter roll to overhang and thereby drop its load onto the active upper stretch of the output conveyor belt 16 where it rounds its upper guide roll 16a. Roll 16a together with the opposite guide roll 16b define the upper stretch of belt 16, whereas the remaining guide rolls 16c, 16d and 16e define the return run of belt 16. Roll 16c is likewise offset so as to increase the angle of wrap of the belt 16 around roll 16b so as to provide overhang of such roll 16b above the discharge chute 24.

A de-icing blower 26 associated with the input conveyor 14 outside the insulating enclosure 12 removes ice from the elements of the conveyor belt on its return to the reloading position. If desired, a similar blower to de-ice the belt 16 may be employed although is normally unnecessary.

Longitudinally extending upright panels mounted close alongside the belt 16 serve to retain accumulations of articles to a desired deep bed fluidization depth on the belt without the articles falling off the sides of the belt. Preferably above the level of the active upper stretch of the belt these side panels 28 and 30 converge toward each other to form an elongated narrowing or funneling slot helping confine and thereby direct the flow of fluidization air or other gas as it traverses the mass of articles on the conveyor so as to assure uniformity of action throughout the mass or bed of articles. A similar set of side partitions 32, 34 are operatively associated with the input conveyor belt 14 and for a similar reason.

Immediately beneath each active upper stretch of the conveyor belts 14 and 16 are mounted one or more sets of refrigeration coils 31 forming a cooling grid which extends largely across the breadth and length of the freezer chamber spaces underlying the respective conveyors. Air driven by banks of blowers into collecting plenums 34 is caused to flow under pressure and more or less uniformly upwardly through the banks of refrigeration coil 31, thence upwardly through the active upper stretches of belts 14 and 16 and the amassed articles carried on such conveyor belts.

The pressure and thereby the flow rate of air upwardly through the belt 16 is sufficient to maintain the bed of articles deposited thereon by conveyor 14 in a state of fluidization even to a depth of 5 inches or more. Air forced upwardly through the foramins of the belt 14 may or may not cause or maintain fluidization of the articles thereon, but preferably it is given sufficient force to do so because fluidization materially increases the chilling efficiency of the input system. However, as previously stated, critically maintained fluidization on the input conveyor is not essential to prevent freeze-bonding of the moist articles because the rate of operation of conveyor 14 in relation to the flow rate and temperature of air or other gas passed upwardly through the amassed articles thereon is adjusted so that the articles in their transit on conveyor 14 are chilled only substantially to the incipient point of freezing, but are not predominantly frozen. Thus most or all of the latent heat is left in the articles as they emerge from conveyor 14 and drop onto to the deep bed fluidization conveyor 16. A drive motor unit with suitable gear reduction, 38, turns conveyor drive roll 14b at a speed selected by the controller 40 so as to achieve the desired cooling and the related desired feed rate to conveyor 16. A similar drive motor unit 42 which turns conveyor drive roll 16b is operated through a speed controller 44. As previously described conveyor 16, preferably of the same width as conveyor 14, operates at a submultiple of the speed of conveyor 14 so as to permit an article deposit averaging ½ inch to 1 inch on conveyor 14 to be increased to 5 inches or more accumulated depth on conveyor 16. Typically, whereas the dwell time on the deep freeze fluidized bed conveyor 16 may be of the order of 6 to 8 minutes, the dwell time on the input conveyor 14 requires only 45 seconds to 1½ minutes with the refrigeration coils cooled by refrigerant at approximately the same temperature ($-25°F$.). Preconditioned food articles dwelling on conveyor 16 in deep bed fluidization move at a relatively slow rate allowing them to be "soaked" in subfreezing gas for a prolonged period wherein all latent heat is removed and the articles are uniformly reduced in temperature to a final optimum for preservation in discharging out the chute 24. On conveyor 16 the conditioned articles are easily and uniformly fluidized with minimal expenditure of energy by the blowers because there is little tendency for them to stick together. Moreover it will be evident that in the improved system a comparatively short-run deep bed fluidization conveyor 16 may be employed and still yield a high output rate, with attendant reduction of required plant floor space and an attendant reduction in equipment cost made possible by the high loading capacity of the conveyor 16.

Suitable controls including thermostatic devices (not shown) and an adjustment control 50, associated with the refrigerant's compressor 52 which delivers pressurized refrigerant to the evaporators 54, provide control over the operating temperature of the coils 31. In practice these are set to operate in the region of −25°F., some 10° warmer than the normal operating temperature used in regular or conventional fluidized bed single-stage commercial food freezers. As a result the energy cost in operating the refrigerant compressor is reduced by as much as 15 to 20%, or more in certain cases.

As previously indicated whereas a continuous flow process is greatly to be preferred in the tandem operation of the sections, the details of design and the types of holding means, such as conveyors, that may be used for the respective stages may vary. The same principles apply and generally the same benefits are obtainable in practicing the invention whether the conveyors be horizontal or sloping belt-type conveyors, static tray-type conveyors of commercially available types, or otherwise. Likewise, the details and arrangements of freezing gas flow recirculating devices, controls, and input and discharge facilities are subject to design variation.

These and other aspects of the invention will become evident to those skilled in the art based on an understanding of the foregoing disclosure thereof, it being intended that the claims which follow be construed within the broad, reasonable interpretation of the terms thereof.

What is claimed is:

1. In I.Q.F. preservation of food and similar articles having surface moisture, the freezing process comprising first subjecting the articles amassed in a first deposit on a foraminous conveyor to flow of gas upwardly through the conveyor and such articles thereon at subfreezing temperature for a selected first time period which takes the articles predominantly to the incipient point of freezing where substantially all of the above-freezing sensible heat is removed without removing the latent heat, with said deposit of articles being in a fluidized state during said first time period, and thereupon subjecting such articles massed in a second deposit, at least a few times deeper than the first deposit, to deep-bed mass fluidization freezing created at least partially by gas at subfreezing temperatures flowed upwardly through the mass for a selected second time period several times longer than the first time period which removes all remaining latent heat from such articles and depresses their temperature materially below freezing throughout.

2. The process defined in claim 1 wherein the gas flowed upwardly through the amassed articles is circulated repeatedly through such deposits thereof and through gas cooling means operated at substantially the same freezing temperature throughout the process.

3. The process defined in claim 2 characterized in that the articles are being substantially continuously conveyed throughout the process using separate conveyors for the respective first and second deposits.

4. The process defined in claim 3 wherein the articles amassed in the first deposit are conveyed at least a few times faster than those amassed in the second deposit.

5. The process defined in claim 1 characterized in that the articles are being substantially continuously conveyed throughout the process using separate conveyors for the respective first and second deposits.

6. The process defined in claim 5 wherein the articles amassed in the first deposit are conveyed at least a few times faster than those amassed in the second deposit.

7. In I.Q.F. processing of food and similar moist articles by deep-bed air-fluidization freezing of the articles amassed together in a deep air-fluidized bed thereof, the preparatory step which conditions the articles relatively quickly against adhering together comprising removing substantially all of the above-freezing sensible heat without removing the latent heat from the articles predominantly by flowing subfreezing air through a mass of the articles in a fluidized state immediately prior to introducing the same into the fluidized bed for deep-bed air-fluidization freezing.

8. I.Q.F. apparatus for processing food and similar moist articles comprising main deep-bed gas-fluidization freezing means therein operable during a predetermined freezing period to deep freeze the articles amassed together in a deep-bed fluidized state created by air at subfreezing temperature blown upwardly through the mass and further including a freezer conveyor operable to convey the articles from a receiving location to a discharge location during such predetermined freezing period, and article conditioning means including separate, input conveyor means operable during a predetermined conditioning period several times shorter than the freezing period, to deliver articles into said main freezing means at the receiving location, and chilling means operable for reducing the temperature of the articles predominantly to the point (substantially 30°F.) that substantially all sensible above-freezing heat has been removed without removal of the latent heat from the articles by blowing air at subfreezing temperature upwardly through the articles on said input conveyor means during said conditioning period with said articles being in a fluidized state.

9. The apparatus defined in claim 8 wherein said input means is a minor fraction of the length of the freezing conveyor and operable to convey the articles at a speed at least a few times faster than the rate of conveyance thereof on the freezing conveyor and with the air blown upwardly through the articles on the input conveyor means having a velocity creating fluidization of such articles.

10. The apparatus defined in claim 9 wherein the freezing means and chilling means comprise air refrigerating apparatus incorporating refrigerant evaporation means operable at substantially the same air refrigerating temperature in both the chilling and freezing means.

11. The apparatus defined in claim 8 wherein the freezing means and chilling means comprise air refrigerating apparatus incorporating refrigerant evaporation means operable at substantially the same air refrigerating temperature in both the chilling and freezing means.

* * * * *